United States Patent
Oh et al.

(10) Patent No.: US 7,790,836 B2
(45) Date of Patent: Sep. 7, 2010

(54) DIAMINE COMPOUND HAVING DENDRON SIDE CHAIN AND LIQUID CRYSTAL ALIGNING AGENT USING SAME

(75) Inventors: Jae Min Oh, Gyeonggi-Do (KR); Moo Young Lee, Gyeonggi-Do (KR); Bum Jin Lee, Gyeonggi-Do (KR); O Bum Kwon, Seoul (KR); Won Seok Dong, Gyeonggi-Do (KR); Yusuke Tsuda, Fukuoka (JP)

(73) Assignee: Cheil Industries Inc., Gyeongsangbuk-Do (KR)

( * ) Notice: Subject to any disclaimer, the term of this patent is extended or adjusted under 35 U.S.C. 154(b) by 0 days.

(21) Appl. No.: 12/592,315

(22) Filed: Nov. 23, 2009

(65) Prior Publication Data

US 2010/0168374 A1 Jul. 1, 2010

Related U.S. Application Data

(62) Division of application No. 11/221,156, filed on Sep. 6, 2005, now abandoned.

(30) Foreign Application Priority Data

Dec. 31, 2004 (KR) .............................. 2004-118128

(51) Int. Cl.
*C08G 69/08* (2006.01)

(52) U.S. Cl. .......................... 528/310; 525/420; 560/30
(58) Field of Classification Search ................. 528/310; 525/420; 560/30
See application file for complete search history.

(56) References Cited

OTHER PUBLICATIONS

Wang et al "Synthesis and characterization of polyimides containing multiple alkyl side chains", Polymer Preprint, vol. 40(2), p. 884-885 (1999).*

* cited by examiner

*Primary Examiner*—James Seidleck
*Assistant Examiner*—Gregory Listvoyb
(74) *Attorney, Agent, or Firm*—Jordan and Hamburg LLP

(57) ABSTRACT

Disclosed herein is a novel functional diamine compound having a dendron structure, polyamic acid which is produced using functional diamine, aromatic cyclic diamine, aliphatic cyclic acid dianhydride, and aromatic cyclic acid dianhydride, polyimide which is produced by imidizing polyamic acid, and an LC alignment film produced using polyimide. Even if the diamine compound is used in a small amount, it is possible to realize a high pretilt angle, thus the pretilt angle is easily controlled. Therefore, it can be used to produce an LC alignment film using a twisted nematic (TN) mode, in which the pretilt angle of liquid crystal is low, and a vertically aligned (VA) mode, which requires a high pretilt angle of about 90°.

9 Claims, 2 Drawing Sheets

DIAMINE COMPOUND HAVING DENDRON SIDE CHAIN AND LIQUID CRYSTAL ALIGNING AGENT USING SAME

The present application is a divisional application under 37 U.S.C. §121 of and claims the benefit of the filing of U.S. patent application Ser. No. 11/221,156, filed Sep. 6, 2005.

BACKGROUND OF THE INVENTION

1. Field of the Invention

The present invention relates to a diamine compound having dendron side chains and an LC (liquid crystal) aligning agent using the same. More particularly, the present invention relates to an LC aligning agent in which shrub-shaped dendron side chains are introduced into a diamine compound so that high heat resistance, high penetration in a visible ray range, excellent alignment capability, high voltage holding ratio, and a high vertical aligning force are assured, and a pretilt angle is easily controlled.

2. Description of the Related Art

Of LC alignment films for effectively aligning liquid crystal molecules, polyimide nicely endures high temperature treatment, and has excellent applicability, rubbability, chemical stability, and alignment controlling ability in comparison with other organic polymer compounds, thus it has been used for various LCDs. Generally, acid anhydride and a diamine compound react with each other in a solvent to produce polyamic acid, and polyamic acid is applied on a substrate, heated, and hardened to be imidized, thereby producing a polyimide-based LC alignment film.

In detail, a polyimide resin for an LC alignment film is produced by polycondensating monomers which are exemplified by aromatic acid dianhydride, such as pyromellitic dianhydride (PMDA) or biphthalic dianhydride (BPDA), and aromatic diamine, such as p-phenylene diamine (p-PDA), m-phenylene diamine (m-PDA), 4,4-methylene dianiline (MDA), 2,2-bis(aminophenyl)hexafluoropropane (HFDA), m-bis(aminophenoxy)diphenylsulfone (m-BAPS), p-bis(aminophenoxy)diphenylsulfone (p-BAPS), 4,4-bis(aminophenoxy)phenylpropane (BAPP), or 4,4-bis(aminophenoxy)phenylhexafluoropropane (HF-BAPP).

However, if only aromatic acid dianhydride and diamine are used as described above, thermal stability, resistance to chemicals, and mechanical properties are excellent, but, disadvantageously, transparency and solubility are reduced due to a charge transfer complex, and electrooptical characteristics are worsened.

Japanese Patent Laid-Open Publication No. Hei. 11-84391 suggests a process which employs an aliphatic cyclic acid dianhydride monomer or aliphatic cyclic diamine so as to avoid the above-mentioned problems. Japanese Patent Laid-Open Publication No. Hei. 6-136122 introduces functional diamine having side chains or functional acid dianhydride having side chains so as to increase the pretilt angle of liquid crystals and achieve stability. Furthermore, U.S. Pat. No. 5,420,233 discloses a vertical alignment-type aligning agent which consists essentially of polyimide having a linear alkyl group containing 12 or more carbons.

Recently, display performances of LCDs have been continuously improved, thus their application fields have expanded to PC monitors, mobile information terminals, large-sized televisions or the like. Accordingly, the demand for high quality LCDs is continuously growing. A wide viewing angle, high brightness, high contrast, and high speed response of the LCD must be assured in order to implement high quality large-sized LCDs. The demand for an LC alignment film having high productivity is growing as the trend toward large area LCDs is rapidly increasing. Hence, there is increased need to develop a high performance LC alignment film which has excellent processability and electrooptical properties and high reliability and which is capable of meeting recent requirements of the LCD. Particularly, a vertically aligned (VA) technology in which vertically aligned liquid crystals are used in a wide viewing angle LCD has been developed, thus there is a need to develop an LC alignment film which is capable of realizing vertical alignment.

SUMMARY OF THE INVENTION

Accordingly, the present invention has been made keeping in mind the above requirements occurring in the prior art to which the present invention pertains, and an object of the present invention is to provide a functional diamine compound which is capable of being used to produce a high performance LC aligning agent having excellent LC alignment, chemical resistance, electrical and optical properties.

The present invention has been made keeping in mind the above requirements occurring in the prior art to which the present invention pertains, and another object of the present invention is to provide a high performance LC aligning agent which has excellent LC alignment, chemical resistance, electrical and optical properties.

Still another object of the present invention is to provide an LC aligning agent which can realize a high pretilt angle, thus making it easy to control the pretilt angle. Accordingly, the LC aligning agent can be used to produce an LC alignment film using a twisted nematic (TN) mode, in which the pretilt angle of liquid crystal is low, and a vertically aligned (VA) mode, which requires the high pretilt angle of about 90°.

According to an aspect of the present invention, in order to accomplish the above objects, the present invention relates to a functional diamine compound which has the structure shown in the following Formula 1 and a dendron side chain.

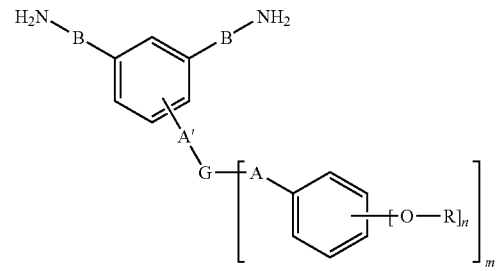

Formula 1 wherein, A and A' are each independently a single bond, or are selected from the group consisting of —O—, —COO—, —OCO—, and —NHCO—; B is a single bond or a benzene ring having an equivalence of 2

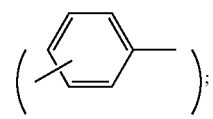

m is 1 to 3; n is 2 or 3; G is a single bond (when m is 1), a benzene ring having an equivalence of 3

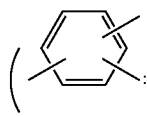

when m is 2), or a benzene ring having an equivalence of 4

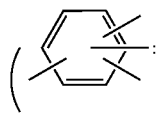

when m is 3); and R is a linear, branched, or cyclic alkyl or fluoroalkyl group having 1 to 30 carbons.

According to another aspect of the present invention, the present invention relates to polyamic acid which is produced by copolymerizing functional diamine, aliphatic cyclic acid dianhydride, aromatic cyclic acid dianhydride, and optionally aromatic cyclic diamine, and polyimide which is a ring-closure polymer of polyamic acid.

According to another aspect of the present invention, the present invention relates to an LC alignment film produced through the procedure in which polyamic acid, polyimide, or a mixture of polyamic acid and polyimide is dissolved in a solvent, applied, totally or partially heated and hardened to be imidized.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
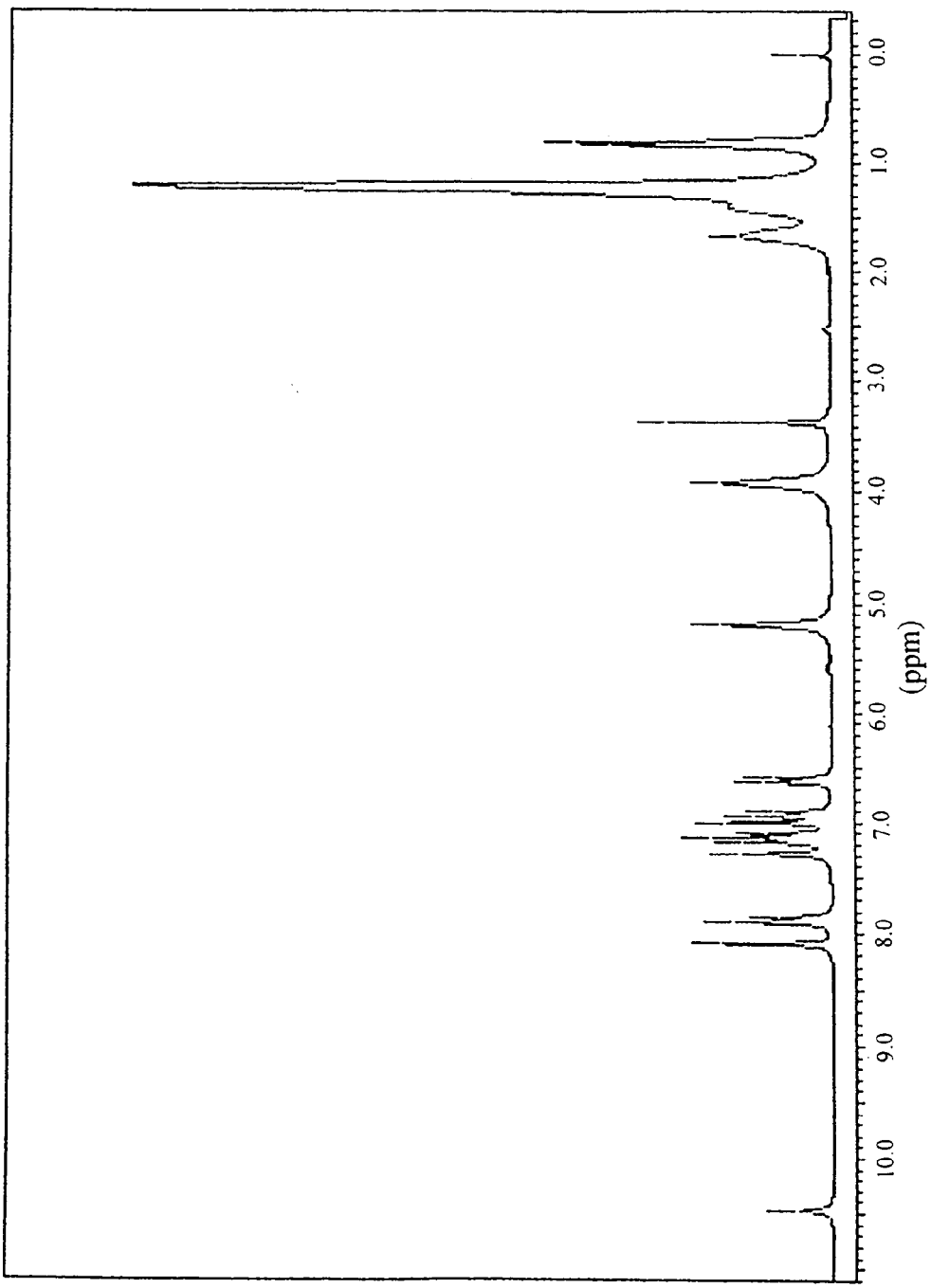
FIG. 1 illustrates an $^1$H-NMR spectrum of a diamine compound according to the present invention.
Figure 2:
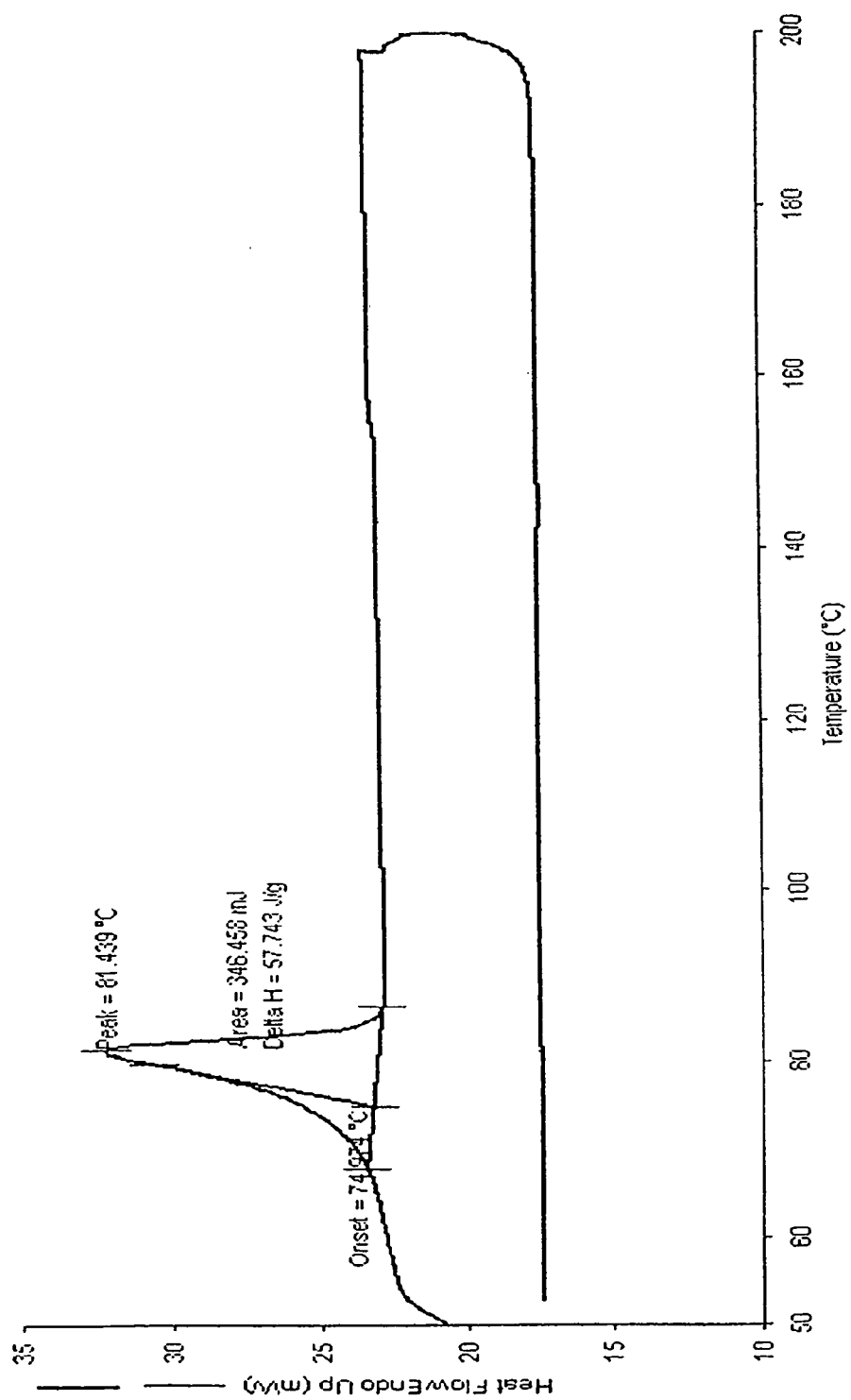
FIG. 2 illustrates the DSC (Differential Scanning Calorimetry) results of the diamine compound according to the present invention.

Hereinafter, a detailed description will be given of the present invention, referring to the accompanying drawings.

The present invention provides diamine having shrub-shaped side chains, which is a functional monomer newly produced by the inventors of the present invention and expressed by the following Formula 1. When polyamic acid or polyimide is produced using functional diamine while its content is controlled and the resulting solution is applied as an LC alignment film on an LCD panel, even if it is used in a small amount, it is possible to control a pretilt angle to a desired value between 1 and 90°. It is also possible to produce an LC alignment film in which the alignment of the liquid crystal is not reduced even after a washing process because chemical resistance is excellent, and an electrooptical property, printability and processability are excellent.

Formula 1

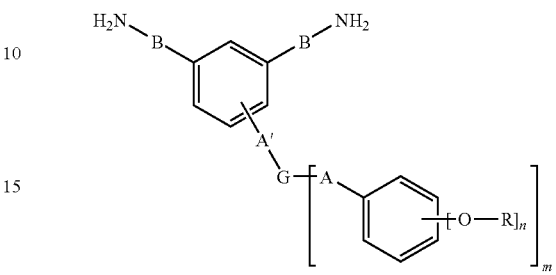

wherein, A and A' are each independently a single bond, or are selected from the group consisting of —O—, —COO—, —OCO—, and —NHCO—; B is a single bond or a benzene ring having an equivalence of 2

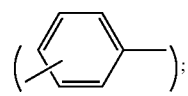

m is 1 to 3; n is 2 or 3; G is a single bond (when m is 1), a benzene ring having an equivalence of 3

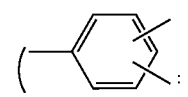

when m is 2), or a benzene ring having an equivalence of 4

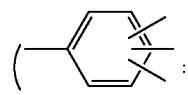

when m is 3); and R is a linear, branched, or cyclic alkyl or fluoroalkyl group having 1 to 30 carbons.

Illustrative, but non-limiting examples of the diamine compound of the present invention include 1261-AG-phenylenediamine expressed by the following Formula 2 and 12G2-AG-phenylenediamine expressed by Formula 3.

Formula 2
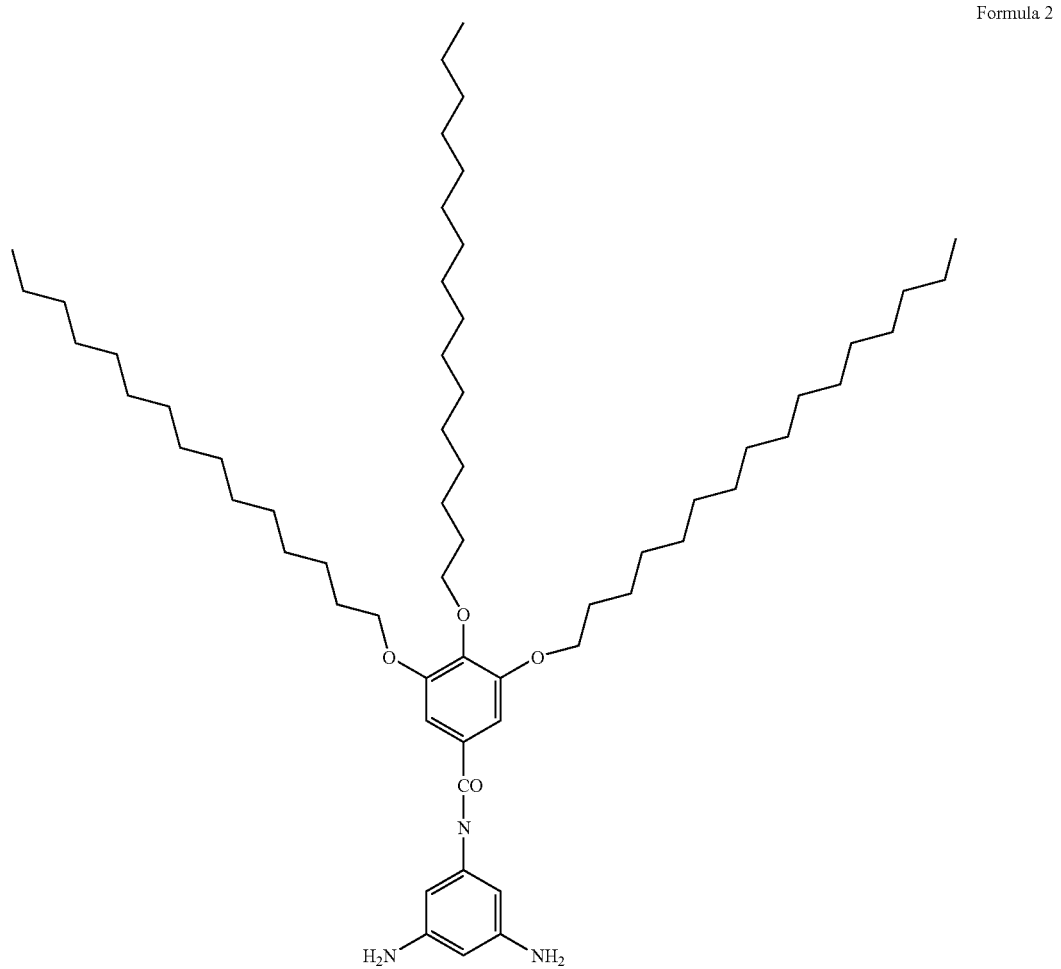

-continued

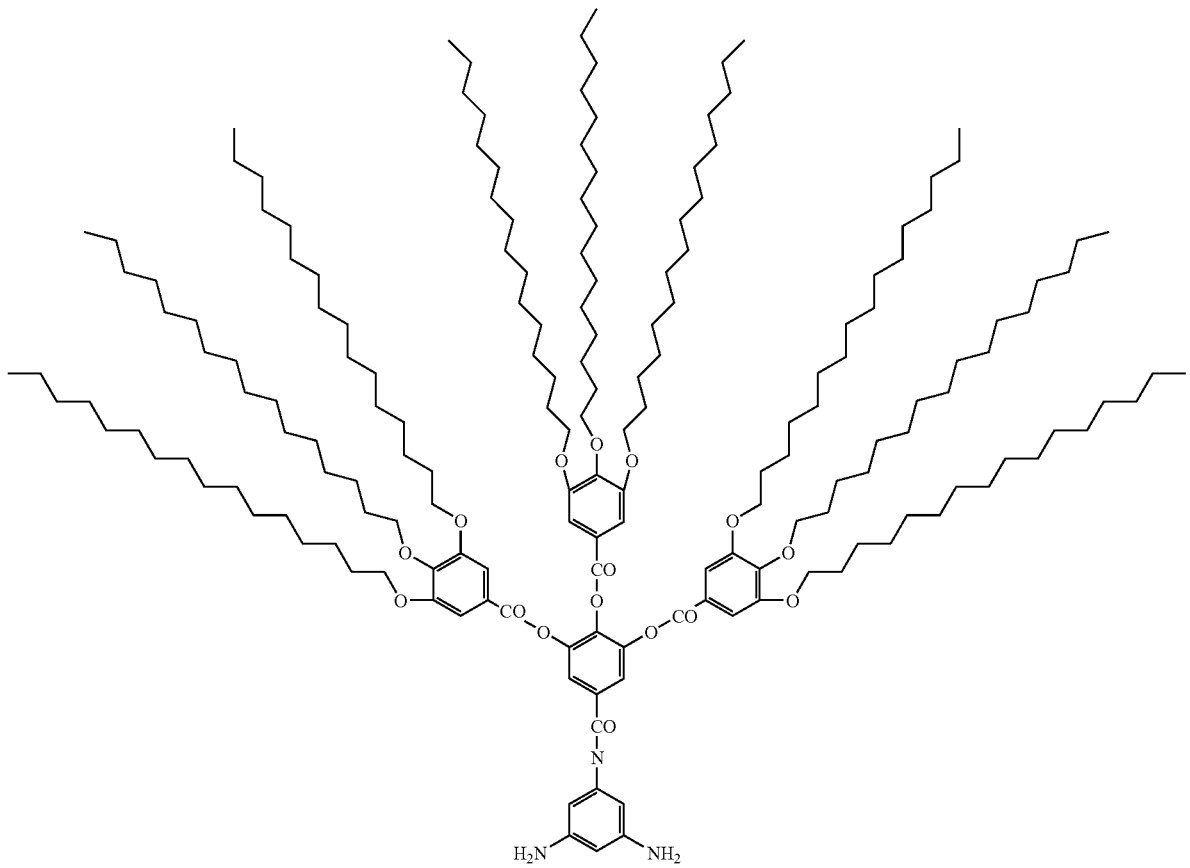

Formula 3

Polyamic acid according to the present invention is produced by copolymerizing functional diamine of the above-mentioned Formula 2, aliphatic cyclic acid dianhydride, aromatic cyclic acid dianhydride, and optionally aromatic cyclic diamine. Generally, a coating solution which is used to produce the LC alignment film is a polyamic acid solution which is applied, dried, heated and hardened to be dehydrated and subjected to a ring-closure reaction, thereby being converted into polyimide. In order to use polyimide of the present invention as an LC aligning agent, a polyimide coating thin film having a uniform thickness must be formed on a substrate on which a transparent electrode is formed. The polyimide solution may be directly applied on the substrate, or may be imidized by heating on the substrate, thereby forming the polyimide coating thin film. The solvent for the polyimide solution and the imidization temperature are determined in accordance with typical technology.

In the LC alignment film of the present invention, it is possible to control the pretilt angle to a desired value by adjusting the content of functional diamine. Since the pretilt angle is controlled depending on the content of functional diamine, polyamic acid which does not include aromatic cyclic diamine but functional diamine depending on the mode of the LCD may be used as the LC alignment film. That is to say, the use of aromatic diamine is selective. In the present invention, the content of functional diamine is preferably 0.1-100 mol %, more preferably 0.5-30 mol %, and most preferably 1-20 mol % based on total diamine monomers.

Illustrative, but non-limiting examples of aromatic cyclic diamine which are capable of being used to produce polyamic acid according to the present invention include p-phenylene diamine (p-PDA), 4,4-methylene dianiline (MDA), 4,4-oxydianiline (ODA), m-bis(aminophenoxy)diphenylsulfone (m-BAPS), p-bis(aminophenoxy)diphenylsulfone (p-BAPS), 2,2-bis(aminophenoxy)phenylpropane (BAPP), and 2,2-bis(aminophenoxy)phenylhexafluoropropane (HF-BAPP).

Aromatic cyclic acid dianhydride which is used to produce polyamic acid of the present invention enables the film formed in a thickness of 0.1 μm or so to be capable of enduring a rubbing process, and to have desired heat resistance in a high temperature process at 200° C. or higher and excellent resistance to chemicals. Illustrative, but non-limiting examples of aromatic cyclic acid dianhydride include pyromellitic dianhydride (PMDA), biphthalic dianhydride (BPDA), oxydiphthalic dianhydride (ODPA), benzophenonetetracarboxylic dianhydride (BTDA), and hexafluoroisopropylidene diphthalic dianhydride (6-FDA). It is preferable that the content of aromatic cyclic acid dianhydride be 10-100 mol % based on the total content of acid dianhydride used.

Aliphatic cyclic acid dianhydride used to produce polyamic acid in the present invention helps avoid problems of insolubility in a typical organic solvent, low penetration in a visible ray range due to a charge transfer complex, and reduction of an electrooptical property due to high polarity of the molecular structure. Illustrative, but non-limiting examples of aliphatic cyclic acid dianhydride available to the present invention include 5-(2,5-dioxotetrahydrofuran-3-yl)-1,2,3,4-tetrahydronaphthalene-1,2-dicarboxylic anhydride (DOTDA), 5-(2,5-dioxotetrahydrofuryl)-3-methyl-3-cyclohexene-1,2-dicarboxylic anhydride (DOCDA), bicyclooctene-2,3,5,6-tetracarboxylic dianhydride (BODA), 1,2,3,4-cyclobutanetetracarboxylic dianhydride (CBDA), 1,2,3,4-cyclopentanetetracarboxylic dianhydride (CPDA), and 1,2,4,5-cyclohexanetetracarboxylic dianhydride (CHDA). The content of aliphatic cyclic acid dianhydride is 5-90 mol %, and preferably 10-50 mol %, based on the total content of acid dianhydride used.

Produced through the above procedure, polyamic acid of the present invention preferably has a structure expressed by the following Formula 4.

Formula 4

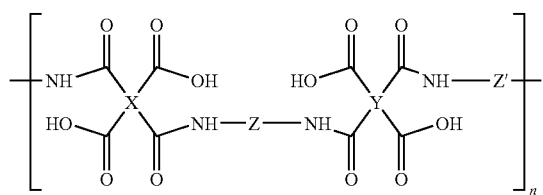

wherein, X includes one or more selected from functional groups expressed by the following Formula 5, Y includes one or more selected from functional groups expressed by the following Formula 6, Z includes one or more functional groups selected from functional groups expressed by the following Formula 7 or 8, and Z' is a functional group expressed by Formula 9.

Formula 5

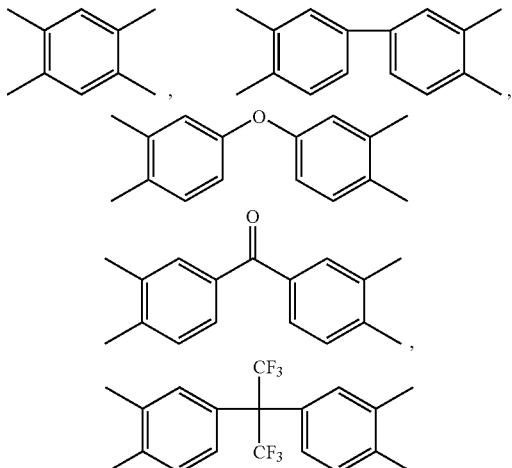

Formula 6

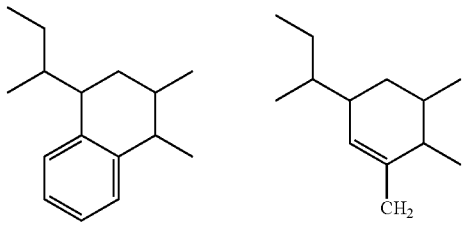

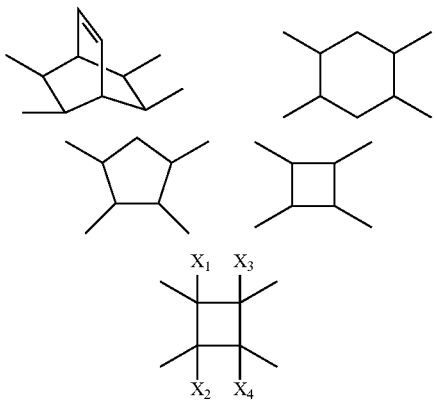

wherein, $X_1$, $X_2$, $X_3$, and $X_4$ are each independently substituents selected from the group consisting of —$CH_3$, —F, and —H.

Formula 7

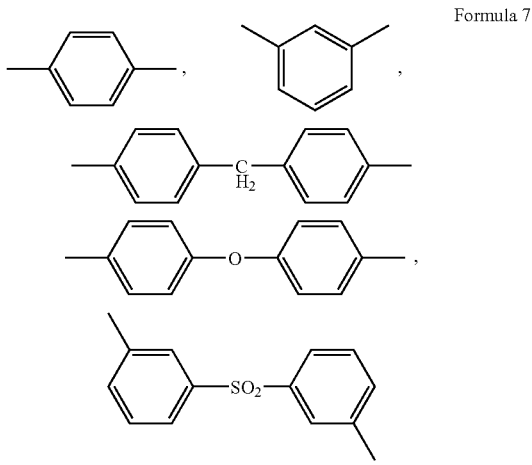

Formula 8

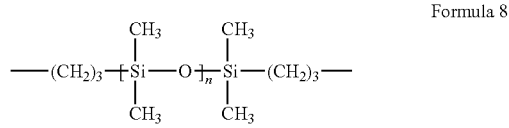

wherein, n is an integer from 1 to 10.

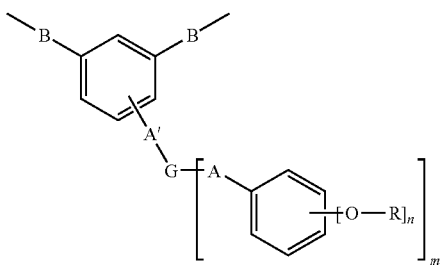

Formula 9 wherein, A and A' are each independently a single bond, or selected from the group consisting of —O—, —COO—, —OCO—, and —NHCO—; B is a single bond or a benzene ring having an equivalence of 2

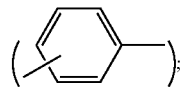

m is 1 to 3; n is 2 or 3; G is a single bond (when m is 1), a benzene ring having an equivalence of 3

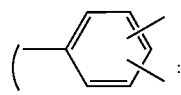

when m is 2), or a benzene ring having an equivalence of 4

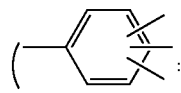

when m is 3); and R is a linear, branched, or cyclic alkyl or fluoroalkyl group having 1 to 30 carbons.

Polyamic acid of the present invention has excellent solubility in a polar aprotic solvent, such as N-methyl-2-pyrrolidone (NMP), gamma-butyrolactone (GBL), dimethylformamide (DMF), dimethylacetamide (DMAc), and tetrahydrofuran (THF). The excellent solubility is considered to be caused by the joint action of aliphatic cyclic acid dianhydride and the side chain which increases the free volume of polymer. With respect to the recent trend toward large size, high resolution, and high quality LCDs, the printability of an aligning agent becomes very influential, thus excellent solubility in the solvent improves printability to a substrate when it is applied to the LC alignment film.

A number average molecular weight of polyamic acid of the present invention is 5,000-500,000 g/mol, and a glass transition temperature ranges from 200 to 350° C. depending on the imidization efficiency or the structure when imidization is conducted.

In the present invention, polyamic acid is dissolved in a solvent, applied on a substrate, and totally or partially imidized to form the LC alignment film. Alternatively, polyamic acid is dissolved in the solvent, applied on the substrate, and totally or partially imidized to produce soluble polyimide, and thereafter, polyimide is used alone or a mixture of polyamic acid and soluble polyimide is used to produce the LC alignment film.

The LC alignment film of the present invention has high light penetration of 90% or higher in a visible ray region and excellent alignment of liquid crystals, and can be used to easily control the pretilt angle within a range of 1-90°. Furthermore, since it contains functional diamine, refractivity of polymer is reduced and a dielectric constant is reduced.

A better understanding of the present invention may be obtained through the following examples and comparative examples which are set forth to illustrate, but are not to be construed as the limits of the present invention.

Example 1

99 mmol 4,4-methylenedianiline, 1 mmol 12G1-AG-phenylenediamine (dendron diamine, Formula 2), and N-methyl-2-pyrrolidone (NMP) were added and dissolved in a four neck flask which was equipped with an agitator, a temperature controller, a nitrogen feeding device, and a cooler while nitrogen flowed therethrough. 50 mmol 5-(2,5-dioxotetrahydrofuran-3-yl)-1,2,3,4-tetrahydronaphthalene-1,2-dicarboxylic anhydride (DOTDA) in a solid state and 50 mmol pyromellitic dianhydride (PMDA) were added thereto and then vigorously agitated. At this stage, the solid content was 15 wt %, and the reaction was conducted at a temperature less than 25° C. for 24 hours to produce a polyamic acid solution.

Example 2

The procedure of example 1 was repeated to produce a polyamic acid solution except that 98 mmol 4,4-methylenedianiline and 20 mmol 12G1-AG-phenylenediamine were used.

Example 3

The procedure of example 1 was repeated to produce a polyamic acid solution except that 95 mmol 4,4-methylenedianiline and 5 mmol 12G1-AG-phenylenediamine were used.

Example 4

The procedure of example 1 was repeated to produce a polyamic acid solution except that 90 mmol 4,4-methylenedianiline and 10 mmol 12G1-AG-phenylenediamine were used.

Example 5

The procedure of example 1 was repeated to produce a polyamic acid solution except that 80 mmol 4,4-methylenedianiline and 20 mmol 12G1-AG-phenylenediamine were used.

Example 6

The procedure of example 1 was repeated to produce a polyamic acid solution except that 60 mmol 4,4-methylenedianiline and 40 mmol 12G1-AG-phenylenediamine were used.

Example 7

The procedure of example 1 was repeated to produce a polyamic acid solution except that 50 mmol 1,2,3,4-cyclobutanetetracarboxylic dianhydride (CBDA) were used instead of 5-(2,5-dioxotetrahydrofuran-3-yl)-1,2,3,4-tetrahydronaphthalene-1,2-dicarboxylic anhydride (DOTDA).

Example 8

The procedure of example 7 was repeated to produce a polyamic acid solution except that 98 mmol 4,4-methylenedianiline and 2 mmol 12G1-AG-phenylenediamine were used.

Example 9

The procedure of example 7 was repeated to produce a polyamic acid solution except that 95 mmol 4,4-methylenedianiline and 5 mmol 12G1-AG-phenylenediamine were used.

Example 10

The procedure of example 7 was repeated to produce a polyamic acid solution except that 90 mmol 4,4-methylenedianiline and 10 mmol 12G1-AG-phenylenediamine were used.

Example 11

The procedure of example 7 was repeated to produce a polyamic acid solution except that 80 mmol 4,4-methylenedianiline and 20 mmol 12G1-AG-phenylenediamine were used.

Example 12

The procedure of example 7 was repeated to produce a polyamic acid solution except that 60 mmol 4,4-methylenedianiline and 40 mmol 12G1-AG-phenylenediamine were used.

Example 13

After 53.3 g of polyamic acid solution, produced according to example 4, were dissolved in N-methyl pyrrolidinone (NMP) in an amount of 10 wt %, 0.1 mol pyridine and 0.1 mol acetic anhydride were added thereto, a cyclization reaction was conducted at 80° C. for 2 hours, and the resulting product was precipitated in methanol to produce 49 g of polymer powder having imidization efficiency of 70%. The polymer powder was sufficiently dried in a vacuum and dissolved in N-methylpyrrolidinone (NMP) to produce a polyimide solution.

Example 14

The procedure of example 13 was repeated to produce a polyimide solution having imidization efficiency of 98% except that 0.13 mol pyridine and 0.25 mol acetic anhydride were added and a cyclization reaction was conducted at 80° C. for 4 hours.

Comparative Example 1

The procedure of example 1 was repeated to produce a polyamic acid solution except that 0.9 mol 4,4-methylenedianiline and 0.1 mol 2,4-diaminophenoxyoctadecane were used.

Comparative Example 2

The procedure of example 1 was repeated to produce a polyamic acid solution except that 80 mmol 4,4-methylenedianiline and 20 mmol 2,4-diaminophenoxyhexadecane were used.

Comparative Example 3

The procedure of example 7 was repeated to produce a polyamic acid solution except that 90 mmol methylenedianiline and 10 mmol 2,4-diaminophenoxyoctadecane were used.

Comparative Example 4

The procedure of example 7 was repeated to produce a polyamic acid solution except that 80 mmol 4,4-methylenedianiline and 20 mmol 2,4-diaminophenoxyhexadecane were used.

Evaluation of Physical Properties of LC Aligning Agent

Test cells were produced using LC alignment film solutions produced according to examples 1-14 and comparative examples 1-4 through the following methods. The pretilt angle, printability, alignment stability, chemical resistance, contrast ratio, remaining DC, and a voltage holding ratio (VHR) of each test cell were measured using the following methods, and the results are described in the following Table 1.

Chemical Resistance

After each LC alignment film solution was applied on an ITO glass having a size of 10 cm×10 cm through a spin coating process in a thickness of 0.1 μm and subjected to a hardening process at 70 and 210° C., the surface of the alignment film, which was subjected to a rubbing process, was sufficiently washed using isopropyl alcohol and pure water and subjected to an assembly process. Liquid crystal was fed thereinto to produce an LCD cell for testing. Voltage of 1-10 V was applied to the LCD cell to operate it, and whether stains were formed by a cleaning solvent was observed, thereby evaluating chemical resistance.

Contrast Ratio, Remaining DC, and Voltage Holding Ratio (VHR)

After each LC alignment film solution was applied on an ITO glass having a size of 3 cm×6 cm through the spin coating process in a thickness of 0.1 μm and subjected to a hardening process at 70 and 210° C., rubbing and assembly processes were conducted to produce an LCD cell for testing. Voltage of 1 V was applied to the test LCD cell to measure the voltage holding ratio (VHR) of the test cell at room temperature and 60° C., voltage of −10 V-+10 V was applied thereto to measure the remaining direct current (RDC) of the test cell, and voltage of 5 V was applied thereto to measure the contrast ratio of the test cell.

Printability

Each LC alignment film solution was applied on the ITO glass substrate in a thickness of 0.1 μm and hardened at 210° C. After the alignment film was formed on the ITO glass substrate, spreading and end-curling properties were observed, both with the naked eye and using an optical microscope, to evaluate the printability of the alignment film.

Alignment Stability and Tilt Angle

The surface of the alignment film was rubbed using a rubbing device, two substrates were disposed parallel to each other such that rubbing directions of the two substrates are in opposite to each other, and a cell was inserted between the two substrates so as to maintain a cell gap of 50 μm. The liquid crystal was charged in the LC cell produced through the above procedure, alignment was observed using an optical microscope which was orthogonally polarized, and the pretilt angle was measured using a crystal rotation method.

TABLE 1

| Sample | Pretilt angle (°) | Printability | Alignment stability | Chemical resistance | Contrast ratio | Molecular weight 10⁴ g/M | Remaining DC | VHR Room temp. | VHR 60° C. |
|---|---|---|---|---|---|---|---|---|---|
| Ex. 1 | 4.0 | Excellent | Excellent | Excellent | 425 | 36 | 35 | 99.1 | 98.0 |
| Ex. 2 | 6.2 | Excellent | Excellent | Excellent | 440 | 28 | 45 | 99.6 | 98.5 |
| Ex. 3 | 88.4 | Excellent | Good | Excellent | 315 | 14 | 70 | 99.5 | 98.3 |
| Ex. 4 | 89.5 | Excellent | Excellent | Excellent | 550 | 6 | 65 | 99.4 | 98.1 |
| Ex. 5 | 89.9 | Excellent | Excellent | Excellent | 560 | 3 | 45 | 99.1 | 97.0 |
| Ex. 6 | 89.9 | Excellent | Excellent | Excellent | 615 | 1 | 30 | 99.2 | 96.6 |
| Ex. 7 | 4.2 | Excellent | Excellent | Excellent | 365 | 33 | 25 | 99.5 | 98.5 |
| Ex. 8 | 5.6 | Excellent | Excellent | Excellent | 330 | 42 | 20 | 99.6 | 97.4 |
| Ex. 9 | 87.7 | Excellent | Good | Excellent | 280 | 40 | 30 | 99.4 | 97.6 |
| Ex. 10 | 89.9 | Excellent | Good | Excellent | 450 | 17 | 45 | 99.7 | 97.6 |
| Ex. 11 | 89.9 | Excellent | Excellent | Excellent | 520 | 5 | 90 | 99.2 | 96.0 |
| Ex. 12 | 89.9 | Excellent | Excellent | Excellent | 515 | 2 | 90 | 99.2 | 97.7 |
| Ex. 13 | 89.5 | Good | Excellent | Excellent | 480 | 3 | 80 | 99.0 | 94.8 |
| Ex. 14 | 89.7 | Medium | Excellent | Excellent | 420 | 4 | 120 | 99.5 | 93.5 |
| Co. Ex. 1 | 12.5 | Excellent | Poor | Poor | 285 | 22 | 120 | 98.9 | 92.1 |
| Co. Ex. 2 | 88.9 | Excellent | Poor | Poor | 520 | 10 | 240 | 98.3 | 91.6 |
| Co. Ex. 3 | 9.3 | Excellent | Poor | Poor | 315 | 26 | 46 | 99.0 | 89.5 |
| Co. Ex. 4 | 87.6 | Excellent | Poor | Poor | 480 | 17 | 360 | 99.4 | 89.4 |

An LC aligning agent which employs a diamine compound according to the present invention has excellent LC alignment and chemical resistance, and excellent electrical and optical properties. Even if it is used in a small amount, it is possible to realize a high pretilt angle, thus the pretilt angle is easily controlled. Therefore, the LC aligning agent can be used to produce an LC alignment film using a twisted nematic (TN) mode, in which the pretilt angle of liquid crystal is low, and a vertically aligned (VA) mode, which requires a high pretilt angle of about 90°.

What is claimed is:

1. A polyamic acid, comprising:
a diamine compound according to either of Formula 1 or Formula 2;

Formula 1

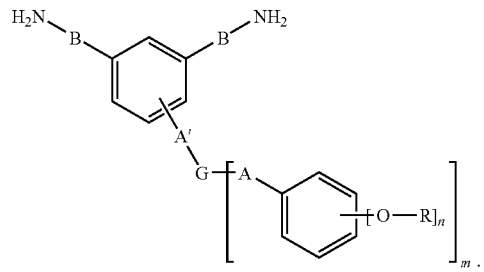

wherein, A and A' are each, independently, a single bond, or are selected from the group consisting of —O—, —COO—, —OCO—, and —NHCO—; B is a single bond or a divalent benzene ring

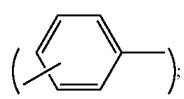

m is 1 to 3; n is 2 or 3; G is a single bond (when m is 1), a trivalent benzene ring

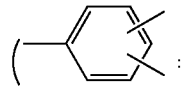

when m is 2), or a tetravalent benzene ring

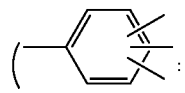

when m is 3); and R is a linear, branched, or cyclic alkyl or fluoroalkyl group having 1 to 30 carbons Formula 2

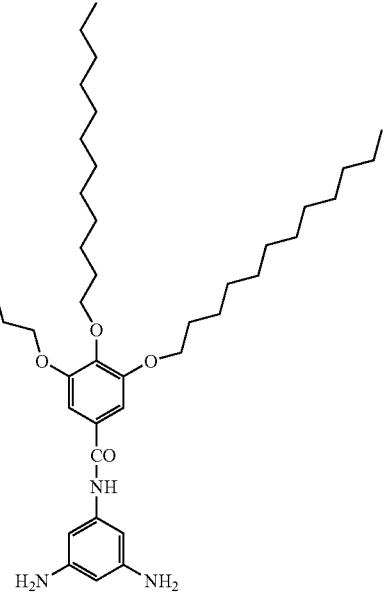

an aliphatic cyclic acid dianhydride;
an aromatic cyclic acid dianhydride; and
optionally an aromatic cyclic diamine; wherein
the diamine compound, the aliphatic cyclic acid dianhydride, the aromatic cyclic acid dianhydride, and optionally the aromatic cyclic diamine are copolymerized, thereby producing the polyamic acid.

2. The polyamic acid as set forth in claim 1, wherein the polyamic acid is expressed by the following Formula 4

Formula 4

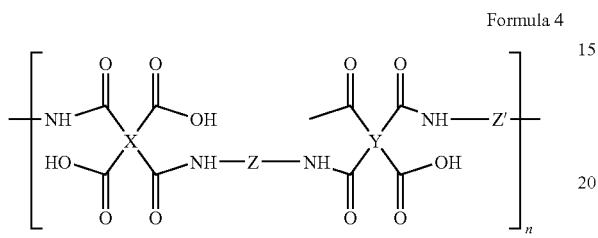

wherein, X is one or more functional groups selected from functional groups represented by Formula 5; Y is one or more functional groups selected from functional groups represented by Formula 6; Z is one or more functional groups selected from functional groups represented by either of Formula 7 or Formula 8; and Z' is selected from of the group represented by Formula 9;

Formula 5

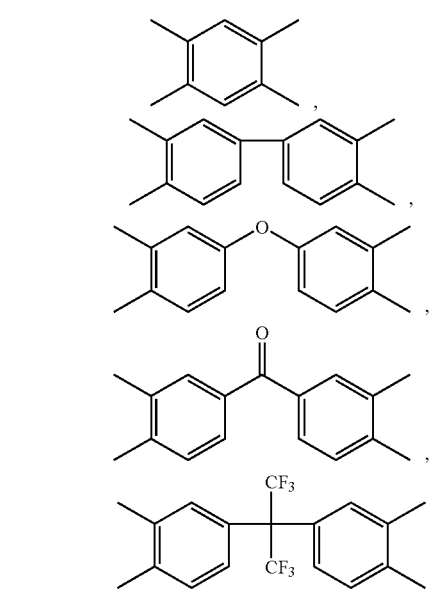

Formula 6

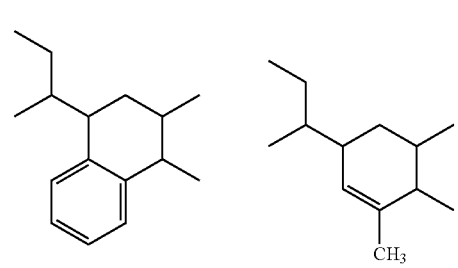

-continued

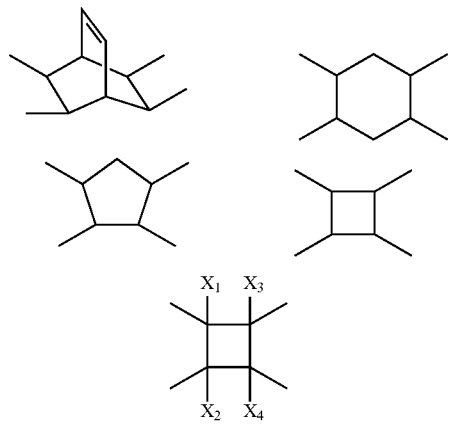

wherein, $X_1$, $X_2$, $X_3$, and $X_4$ are each independently substituents selected from the group consisting of —$CH_3$, —F, and —H Formula 7

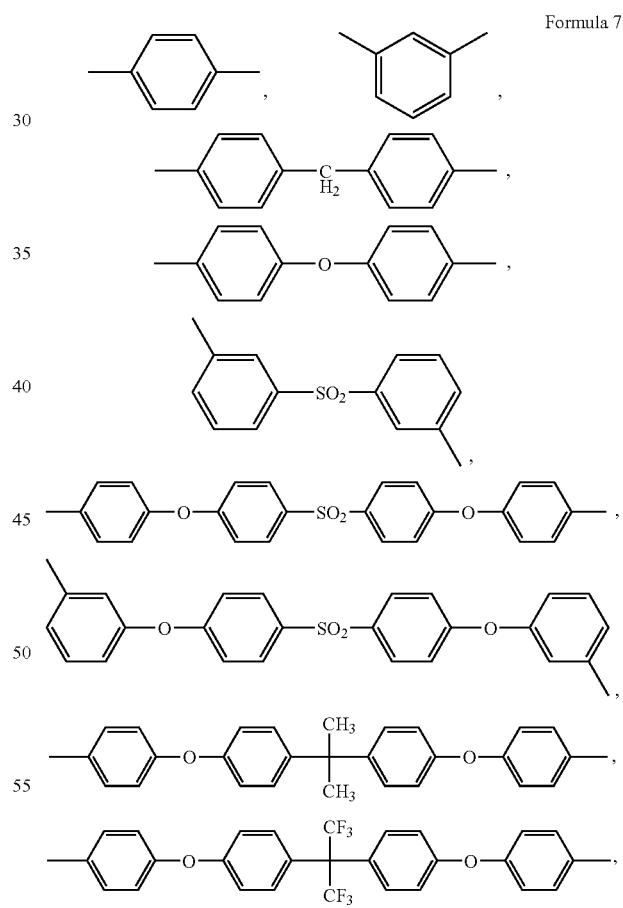

Formula 8 wherein, n is an integer from 1 to 10

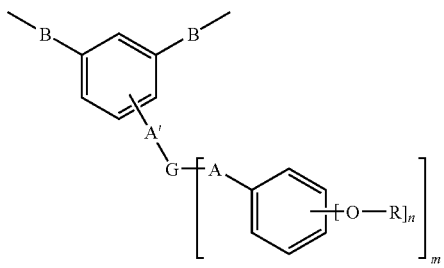

Formula 9 wherein, A and A' are each, independently, a single bond, or are selected from the group consisting of —O—, —COO—, —OCO—, and —NHCO—; B is a single bond or a divalent benzene ring

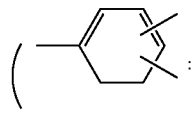

m is 1 to 3; n is 2 or 3; G is a single bond (when m is 1), a trivalent benzene ring

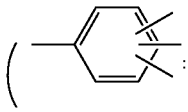

when m is 2), or a tetravalent benzene ring when m is 3); and R is a linear, branched, or cyclic alkyl or fluoroalkyl group having 1 to 30 carbons.

3. The polyamic acid as set forth in claim 1, wherein an average molecular weight of the polyamic acid is 5000-500,000 g/mol.

4. The polyamic acid of claim 1, wherein content of the diamine of Formula 1 is 0.1-100 mol % and content of the aromatic cyclic diamine is 0-99.9 mol % based on total diamine monomers contained in the polyamic acid.

5. The polyamic acid of claim 1, wherein content of the aliphatic cyclic acid dianhydride is 5-90 mol % and content of the aromatic cyclic acid dianhydride is 10-95 mol % based on total acid dianhydride contained in the polyamic acid.

6. A polyimide compound produced by partially or totally imidizing the polyamic acid according to claim 1.

7. The polyimide compound of claim 6 that is a liquid crystal alignment film.

8. A liquid crystal alignment film produced by totally or partially imidizing a combination comprising the polyamic acid according to claim 1.

9. A liquid crystal display comprising the liquid crystal alignment film according to claim 7.

* * * * *